United States Patent
Kwon et al.

(10) Patent No.: US 9,252,451 B2
(45) Date of Patent: Feb. 2, 2016

(54) FLEXIBLE SECONDARY BATTERY

(71) Applicant: Samsung Electronics Co., Ltd., Suwon-si, Gyeonggi-do (KR)

(72) Inventors: Moon-seok Kwon, Hwaseong-si (KR); Jae-man Choi, Hwaseong-si (KR); Min-sang Song, Seongnam-si (KR); Myung-hoon Kim, Seoul (KR); Jeong-kuk Shon, Hwaseong-si (KR); Seung-sik Hwang, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 145 days.

(21) Appl. No.: 13/735,356

(22) Filed: Jan. 7, 2013

(65) Prior Publication Data

US 2013/0260205 A1 Oct. 3, 2013

(30) Foreign Application Priority Data

Apr. 3, 2012 (KR) ........................ 10-2012-0034579

(51) Int. Cl.
*H01M 10/04* (2006.01)
*H01M 4/66* (2006.01)
*H01M 4/70* (2006.01)

(52) U.S. Cl.
CPC ................ *H01M 10/04* (2013.01); *H01M 4/66* (2013.01); *H01M 4/70* (2013.01); *H01M 10/0436* (2013.01); *H01M 4/661* (2013.01); *H01M 4/662* (2013.01); *H01M 4/667* (2013.01); *H01M 4/668* (2013.01); *H01M 2220/30* (2013.01)

(58) Field of Classification Search
None
See application file for complete search history.

(56) References Cited

U.S. PATENT DOCUMENTS

| 5,587,253 | A | 12/1996 | Gozdz et al. |
| 7,191,502 | B1 * | 3/2007 | Ashizawa et al. ................ 29/2 |
| 2007/0048602 | A1 * | 3/2007 | Kim ............................ 429/144 |
| 2009/0325066 | A1 * | 12/2009 | Kwon et al. ................... 429/209 |
| 2010/0028766 | A1 * | 2/2010 | Peckerar et al. ............. 429/121 |

FOREIGN PATENT DOCUMENTS

| JP | 07245110 A | 9/1995 |
| JP | 2000306611 A | 11/2000 |
| JP | 2003230234 A | 8/2003 |
| JP | 2003331827 A | 11/2003 |
| JP | 2006310261 A | 11/2006 |
| KR | 1020020017973 A | 3/2002 |
| KR | 1020090089581 A | 8/2009 |
| KR | 1020100000655 A | 1/2010 |

* cited by examiner

*Primary Examiner* — Patrick Ryan
*Assistant Examiner* — Haixia Zhang
(74) *Attorney, Agent, or Firm* — Cantor Colburn LLP

(57) ABSTRACT

A flexible battery a first electrode layer, a first current collector layer disposed on the first electrode layer, where a plurality of through-holes is defined in the first current collector layer, a separator disposed on the first current collector layer, a second current collector layer disposed on the separator, where a plurality of through-holes is defined in the second current collector layer, and a second electrode layer disposed on the second current collector layer.

20 Claims, 6 Drawing Sheets

FLEXIBLE SECONDARY BATTERY

CROSS-REFERENCE TO RELATED APPLICATIONS

This application claims priority to Korean Patent Application No. 10-2012-0034579, filed on Apr. 3, 2012, and all the benefits accruing therefrom under 35 U.S.C. §119, the content of which in its entirety is herein incorporated by reference.

BACKGROUND

1. Field

The invention relates to secondary batteries, and in particular, to flexible secondary batteries.

2. Description of the Related Art

A recent development of electronic technology has led to rapid expansion of markets for various electronic devices, such as smartphones, smart pads, electronic books, watch-shaped telephones and mobile medical devices, which may be bonded to the human body, in addition to mobile phones, game players, portable multimedia players ("PMP"s) and MPEG audio layer-3 ("MP3") players. Due to the growth of the markets for such mobile electronic devices, a demand for batteries that are suitable for driving the mobile electronic devices is increasing.

In particular, for convenience during use of mobile electronic devices, a demand for flexibility of a battery is gradually increasing. Also, for ease of installation of a battery in a limited space of the mobile electronic devices, a required flexibility level of a battery is further increasing.

If a battery that is not sufficiently flexible is bent, a stress may be focused on, for example, an interface of a separator and electrode active material layers of two electrodes, an inner interface of an electrode active material layer, or an interface of an electrode active material layer and a current collector, thereby causing peeling. This may negatively affect performance and lifespan of the battery.

A typical and commercially available lithium ion secondary battery may have a structure of current collector-positive active material layer-separator-negative active material layer-current collector. If a battery having such a structure is repeatedly deformed, relative positions of reacting electrodes or an interval between electrodes may be changed, thereby leading to an unstable electrochemical reaction that may cause a decrease in performance of a battery, and more seriously, a short.

SUMMARY

Provided are flexible batteries where impairments may occur during bending, such as exfoliation between an electrode's inner components and a relative position change of an electrode's inner components, for example, are effectively prevented.

Additional aspects will be set forth in part in the description which follows and, in part, will be apparent from the description, or may be learned by practice of the embodiments described herein.

According to an embodiment of the invention, a flexible secondary battery includes: a first electrode layer; a first current collector layer disposed on the first electrode layer, where a plurality of through-holes is defined in the first current collector layer; a separator disposed on the first current collector layer; a second current collector layer disposed on the separator, where a plurality of through-holes is defined in the second current collector layer; and a second electrode layer disposed on the second current collector layer.

In an embodiment, each of the first current collector layer and the second current collector layer may be a conductive mesh screen or a conductive perforated film.

In an embodiment, each of the first current collector layer and the second current collector layer may include copper, stainless steel, titanium, nickel, aluminum, or a combination or alloy thereof.

In an embodiment, a thickness of each of the first current collector layer and the second current collector layer may be in a range of about 1 micro meter ($\mu$m) to about 100 $\mu$m.

In an embodiment, a diameter of the through-holes of each of the first current collector layer and the second current collector layer may be in a range of about 50 $\mu$m to about 2 millimeters (mm).

In an embodiment, the number of the through-holes of each of the first current collector layer and the second current collector layer may be in a range of about 10 per inch to about 400 per inch.

In an embodiment, a total thickness of the flexible secondary battery may be in a range of about 25 $\mu$m to about 2 mm.

In an embodiment, the flexible secondary battery may further include a first substrate attached to an outer surface of the first electrode layer.

In an embodiment, the flexible secondary battery may further include a first adhesive layer disposed on at least a portion of a surface of the first current collector layer which faces the separator.

In an embodiment, the first adhesive layer may be any adhesive polymer layer. The first adhesive layer may include a polyvinylalcohol-based resin; a fluorine resin, such as polyvinylidene fluoride ("PVDF"), polytetrafluoroethylene, a tetrafluoroethylene-hexafluoropropylene copolymer or Nafion®; a polyacrylic acid-based resin, such as a polyacrylic acid, a polymethyl acrylate ester, a polyethyl acrylate ester or a polyacrylic acid hexyl ester; a polymethacrylic acid-based resin, such as a polymethacrylic acid, a polymethyl methacrylate ester, a polyethyl methacrylate ester or a polymethacrylic acid hexyl ester; polyamide, polyimide, polyamideimide, polyvinylacetate, polyvinylpyrrolidone, polyether, polyethersulfone, hexafluoropolypropylene, styrene-butadiene rubber, carboxymethyl cellulose, polyacrylonitrile or a derivative thereof; polyethylene, polypropylene, an aramid resin, a polymer of an ethylene propylene diamine monomer ("EPDM"), polyethylene oxide ("PEO") or polypyrrol; a copolymer of two or more materials selected from tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, a fluoromethyl vinyl ether, an acrylic acid and hexadiene; or a combination thereof.

In an embodiment, a thickness of the first adhesive layer may be in a range of about 0.01 $\mu$m to about 100 $\mu$m.

In an embodiment, the flexible secondary battery may further include a second adhesive layer disposed on at least a portion of a surface of the second current collector layer which faces the separator.

In an embodiment, the second adhesive layer may include a polyvinylalcohol-based resin; a fluorine resin, such as PVDF, polytetrafluoroethylene, a tetrafluoroethylene-hexafluoropropylene copolymer or Nafion®; a polyacrylic acid-based resin, such as a polyacrylic acid, a polymethyl acrylate ester, a polyethyl acrylate ester or a polyacrylic acid hexyl ester; a polymethacrylic acid-based resin, such as a polymethacrylic acid, a polymethyl methacrylate ester, a polyethyl methacrylate ester or a polymethacrylic acid hexyl ester; polyamide, polyimide, polyamideimide, polyvinylacetate, polyvinylpyrrolidone, polyether, polyethersulfone, hexafluoropolypropylene, styrene-butadiene rubber, carboxymethyl cellulose, polyacrylonitrile or a derivative thereof; polyethylene, polypropylene, an aramid resin, a polymer of an EPDM, PEO or polypyrrol; a copolymer of two or more materials selected from tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, a fluoromethyl vinyl ether, an acrylic acid and hexadiene; or a combination thereof.

In an embodiment, a thickness of the second adhesive layer may be in a range of about 0.01 µm to about 100 µm.

In an embodiment, the flexible secondary battery may further include a coupling member which binds the current collector layers and the separator.

In an embodiment, the coupling member may include an insulating thread which ties together the first current collector layer, the separator and the second current collector layer.

In an embodiment, the coupling member may include an insulating pillar which passes through the first electrode layer, the first current collector layer, the separator, the second current collector layer and the second electrode layer.

In an embodiment, the coupling member may include a third adhesive layer which fills some of the through-holes of the first current collector layer.

In an embodiment, the coupling member may include a fourth adhesive layer which fills some of the through-holes of the second current collector layer.

In an embodiment, the coupling member may include a first polymer film coated on an outer surface of the first electrode layer, and a second polymer film coated on an outer surface of the second electrode layer, the first polymer film may have a plurality of pressing points which pass through the first electrode layer and the first current collector layer and binds to the separator, and the second polymer film may have a plurality of pressing points which pass through the second electrode layer and the second current collector layer and binds to the separator.

According to another embodiment of the invention, a half cell includes: a first electrode layer; a first current collector layer disposed on the first electrode layer, where a plurality of through-holes is defined in the first current collector layer; and a separator disposed on the first current collector layer.

According to another embodiment of the invention, a battery stack includes a plurality of flexible secondary batteries including the flexible secondary battery or the half cell.

In an embodiment, the flexible secondary batteries may be arranged such that two adjacent electrode layers have the same polarity.

In an embodiment, the battery stack may further include a conductive or non-conductive thin film inserted between the two adjacent electrode layers.

In an embodiment, the battery stack may further include a conductive or non-conductive thin film inserted between the two adjacent electrode layers.

In an embodiment, the flexible secondary batteries may be arranged such that two adjacent electrode layers have different polarities, and an insulating film may be inserted between the two adjacent electrode layers.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
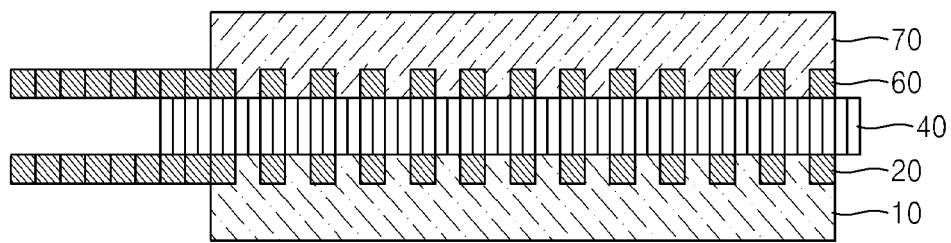
FIG. 1 is a cross-sectional view of an embodiment of a flexible secondary battery according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Reference will now be made in detail to embodiments, examples of which are illustrated in the accompanying drawings, where like reference numerals refer to like elements throughout. In this regard, the embodiments may have different forms and should not be construed as being limited to the descriptions set forth herein. Accordingly, the embodiments are merely described below, by referring to the figures, to explain aspects of the description. Expressions such as "at least one of," when preceding a list of elements, modify the entire list of elements and do not modify the individual elements of the list.

FIG. 1 is a cross-sectional view of an embodiment of a flexible secondary battery according to the invention. The flexible secondary battery includes a first electrode layer 10, a first current collector layer 20 that is disposed on the first electrode layer 10 and includes a plurality of through-holes, a separator 40 disposed on the first current collector layer 20, a second current collector layer 60 that is disposed on the separator 40 and includes a plurality of through-holes, and a second electrode layer 70 disposed on the second current collector layer 60.

The first electrode layer 10 may be a positive active material layer or a negative active material layer. In an embodiment, the first electrode layer 10 is a positive active material layer, and the second electrode layer 70 is a negative active material layer. In an alternative embodiment, the first electrode layer 10 is a negative active material layer, and the second electrode layer 70 is a positive active material layer.

In an embodiment, the flexible secondary battery may be a lithium ion polymer battery. In such an embodiment, a positive active material layer may include a lithium composite oxide, a conductive agent and a binder, a negative active material layer may include a carbon or graphite powder and a binder, a separator may include a polymer solid electrolyte, and a current collector layer may include a metal film or carbon paper, where these layers may be bound to each other by thermal pressing. According to embodiments of the invention, a binding power between a current collector layer material and a separator material is substantially stronger than an attachment power between a separator material and an electrode layer material.

In an embodiment of the flexible secondary battery of FIG. 1, a current collector layer is disposed between an electrode layer and a separator based on characteristics of such materials. In such an embodiment, the first current collector layer 20 is interposed between the first electrode layer 10 and the separator 40, and the second current collector layer 60 is interposed between the second electrode layer 70 and the separator 40.

Typically, among constituents of a battery, a current collector layer may experience the greatest degree of expansion/shrinking. Accordingly, when the battery of FIG. 1 is bent by pulling opposite ends thereof downward, the second current collector layer 60 disposed outside the radius of curvature may function as a reference surface that defines dimensions of the battery. Accordingly, the first current collector layer 20 disposed inside the radius of curvature of the curved battery may be exfoliated from adjacent constituents (for example, the separator 40 of FIG. 1), thereby protruding toward the outside (for example, downward in FIG. 1) to secure a region for the first current collector layer 20 to occupy.

If the first current collector layer 20 is attached to a lower surface of the first electrode layer 10, due to a relatively weak attachment power between the first current collector layer 20 and the first electrode layer 10, the first current collector layer 20 may be exfoliated from the first electrode layer 10, thereby protruding downward.

In the embodiment of the battery of FIG. 1, the first current collector layer 20 and the separator 40 have a relatively strong attachment power. Accordingly, when the battery of FIG. 1 is bent by pulling opposite ends thereof downward, the first current collector layer 20 is not exfoliated from the separator 40. In such an embodiment, the separator 40 is substantially strongly attached to the second current collector layer 60, which is a reference surface, and the first current collector layer 20 is substantially strongly attached to the separator 40. Thus, the second current collector layer 60, the separator 40 and the first current collector layer 20 are integrated together and are bent simultaneously. Also, since the second current collector layer 60, the separator 40 and the first current collector layer 20 support each other, the structure of second current collector layer 60-separator 40-first current collector layer 20 may not be substantially bent. As described above, according to embodiments of the invention, a location of a current collector layer may attribute to an increase in flexibility of a battery.

Each of the first current collector layer 20 and the second current collector layer 60 includes a plurality of through-holes for ion delivery between the separator 40 and the first electrode layer 10 and ion delivery between the separator 40 and the second electrode layer 70. In such an embodiment, the separator 40 contacts the first electrode layer 10 through the through-holes of the first current collector layer 20, and the separator 40 contacts the second electrode layer 70 through the through-holes of the second current collector layer 60. Accordingly, even when the first current collector layer 20 is interposed between the first electrode layer 10 and the separator 40, the ion delivery between the first electrode layer 10 and the separator 40 may be secured. Also, even when the second current collector layer 60 is interposed between the second electrode layer 70 and the separator 40, the ion delivery between the second electrode layer 70 and the separator 40 may be secured.

In an embodiment, each of the first current collector layer 20 and the second current collector layer 60 may be, for example, a conductive mesh screen or a conductive perforated film. In such an embodiment, the through-holes of the first current collector layer 20 and the second current collector layer 60 may be, for example, circular, oval, triangular, tetragonal, hexagonal, octagonal or the like.

In an alternative embodiment, each of the first current collector layer 20 and the second current collector layer 60 may be, for example, a metal sheet or a carbon sheet. In such an embodiment, the metal sheet may include, for example, copper, stainless steel, titanium, nickel, aluminum, or a combination or alloy thereof.

When thicknesses of the first current collector layer 20 and the second current collector layer 60 are too small, the first and second current collector layers 20 and 60 may be destroyed during a manufacturing process, and that conductivity thereof may be reduced. When the thicknesses of the first current collector layer 20 and the second current collector layer 60 are too great, flexibility may be reduced. In an embodiment, the thicknesses of the first current collector layer 20 and the second current collector layer 60 may be in a range of, for example, about 1 micrometer ($\mu m$) to about 100 $\mu m$.

When diameters of the through-holes of the first current collector layer 20 and the second current collector layer 60 are too small, ions, such as lithium ions, may not effectively flow therebetween. When the diameters of the through-holes of the first current collector layer 20 and the second current collector layer 60 are too great, electric resistance of an electrode layer may be increased. In an embodiment, the diameters of the through-holes of the first current collector layer 20 and the second current collector layer 60 may be, for example, in a range of about 50 $\mu m$ to about 2 millimeters (mm).

When densities of the through-hole formations of the first current collector layer 20 and the second current collector layer 60 are too low, an ion flow distance may be relatively long and thus performance of a formed battery may be decreased. When the through-hole formation densities of the first current collector layer 20 and the second current collector layer 60 are too high, an electric resistance of a current collector, or a contact resistance between a current collector and an electrode layer may be relatively high and thus performance of a formed battery may be reduced. In an embodiment, the through-hole formation densities of the first current collector layer 20 and the second current collector layer 60 may be, for example, in a range of about 10 units to about 400 units per inch.

When an overall thickness of the flexible secondary battery is too great, flexibility thereof may be decreased. In an embodiment, the overall thickness of an embodiment of the flexible secondary battery of FIG. 1 may be, for example, about 2 mm or less. When the overall thickness of the flexible secondary battery is too small, capacitance of a formed battery may be reduced. In an embodiment, the overall thickness of an embodiment of the flexible secondary battery of FIG. 1 may be, for example, about 25 $\mu m$ or more.

An embodiment of a method of manufacturing the flexible secondary battery of FIG. 1 will now be described. In such an embodiment, a first electrode layer, a first current collector layer, a separator, a second current collector layer and a second electrode layer are sequentially deposited; and then the structure of first electrode layer-first current collector layer-separator-second current collector layer-second electrode layer is thermally pressed. In such an embodiment, during the thermal pressing, the first electrode layer and the separator enter through-holes of the first current collector layer and contact each other, and the second electrode layer and the separator enter through-holes of the second current collector layer and contact each other.

An alternative embodiment of a method of manufacturing the flexible secondary battery of FIG. 1 will now be described. In such an embodiment, a first electrode layer is printed on a first current collector layer, and then an adhesive layer is provided, e.g., formed, on the first current collector layer. Separately, a second electrode layer is printed on a second current collector layer, and then an adhesive layer is provided on the second current collector layer. In such an embodiment, an adhesive layer is provided on two sides of an electrolyte layer, and the layers of the flexible secondary battery are stacked to form a structure of first electrode layer-first current collector layer-electrolyte layer-second current collector layer-second electrode layer, and then thermally pressed. In such an embodiment, a liquid electrolyte is injected into the structure to allow an electrode layer to completely contact the electrolyte.

Another alternative embodiment of a method of manufacturing the flexible secondary battery of FIG. 1 will now be described. In such an embodiment, a first electrode layer is printed on a first current collector layer, and then an adhesive solution is coated on the first current collector layer. Separately, a second electrode layer is printed on a second current collector layer, and then an adhesive solution is coated on the second current collector layer. In such an embodiment, before the coated adhesive solutions have dried, the layers of the flexible secondary battery are stacked to form a structure of first electrode layer-first current collector layer-electrolyte layer-second current collector layer-second electrode layer, and then dried. In such an embodiment, a liquid electrolyte is injected thereto to allow an electrode layer to completely contact the electrolyte.

Another alternative embodiment of a method of manufacturing the flexible secondary battery of FIG. 1 will hereinafter be described. In such an embodiment, a first electrode layer is printed on a first substrate, a first current collector layer is placed on the first electrode layer, a separator is placed on the first current collector layer, a second current collector layer is placed on the separator, a second electrode layer is printed on the second current collector layer, and the structure of first substrate-first electrode layer-first current collector layer-separator-second current collector layer-second electrode layer is thermally pressed. In such an embodiment, the first substrate attached to an outer surface of the first electrode layer is further provided. In an embodiment, the first substrate may be, for example, a plastic film, a metal film, paper or fabric.

Figure 2:
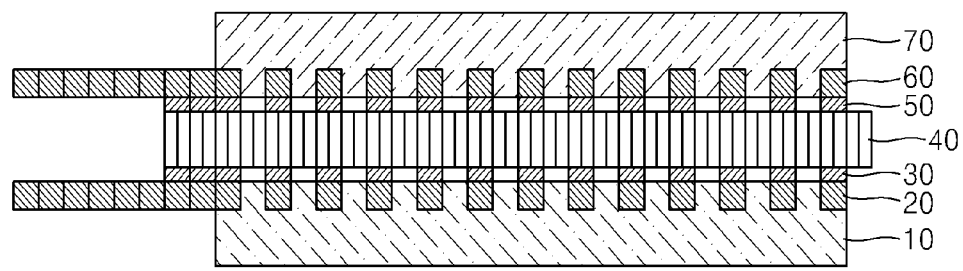
FIG. 2 is a cross-sectional view of an alternative embodiment of a flexible secondary battery according to of the invention, where the flexible secondary battery includes an adhesive layer.

In an alternative embodiment of a flexible battery according to the invention may further include a first adhesive layer provided on at least a portion of a surface of a first current collector layer facing a separator. FIG. 2 is a cross-sectional view of an alternative embodiment of the flexible battery according to the invention. In an embodiment, a first adhesive layer 30 may bind the first current collector layer 20 with the separator 40, such that when the battery of FIG. 2 is bent, separation of the first current collector layer 20 and the separator 40 is effectively prevented. In such an embodiment, any change in relative positions of the first current collector layer 20 and the separator 40 may be effectively prevented.

Such an alternative embodiment of a flexible battery according to the invention may further include a second adhesive layer that is formed on at least a portion of a surface of a second current collector layer facing a separator. FIG. 2 is a cross-sectional view of alternative embodiment of the flexible battery according to the invention. In such an embodiment, a second adhesive layer 50 may bind the second current collector layer 60 with the separator 40, such that when the battery of FIG. 2 is bent, separation of the second current collector layer 60 and the separator 40 is effectively prevented. In such an embodiment, any change in relative positions of the second current collector layer 60 and the separator 40 may be prevented. In an embodiment, the first adhesive layer and the second adhesive layer may be collectively included in a flexible battery, as illustrated in FIG. 2.

In such an embodiment, the first and second adhesive layers may enhance an attachment power between a current collector layer and a separator. Accordingly, even when a battery is bent to have a relatively small radius of curvature, a current collector may not be exfoliated from a separator. In such an embodiment, the adhesive layers may be included when a current collector is interposed between an electrode layer and a separator. If, as in a typical battery, when a current collector is disposed on an outer surface of an electrode, a non-conductive adhesive layer may not be effectively applied with a relatively strong adhesive power to the current collector. When the current collector and an electrode layer are attached to each other using a non-conductive adhesive agent, the current collector may not be electrically connected to the electrode layer.

In an embodiment, materials that may be included in the first adhesive layer and the second adhesive layer are as follows: a polyvinylalcohol-based resin; a fluorine resin, such as polyvinylidene fluoride ("PVDF"), polytetrafluoroethylene, a tetrafluoroethylene-hexafluoropropylene copolymer, or Nafion®; a polyacrylic acid derivative, such as a polyacrylic acid, a polymethyl acrylate ester, a polyethyl acrylate ester, or a polyacrylic acid hexyl ester; a polymethacrylic acid derivative, such as a polymethacrylic acid, a polymethyl methacrylate ester, a polyethyl methacrylate ester, or a polymethacrylic acid hexyl ester; polyamide, polyimide, polyamideimide, polyvinylacetate, polyvinylpyrrolidone, polyether, polyethersulfone, hexafluoropolypropylene, a butadiene rubber, carboxymethyl cellulose, polyacrylonitrile, or a derivative thereof; polyethylene, polypropylene, an aramid resin, a polymer of an ethylene propylene diamine monomer ("EPDM"), polyethylene oxide ("PEO"), or polypyrrol; a copolymer of two or more materials selected from tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, a fluoromethyl vinyl ether, an acrylic acid, and hexadiene; or a combination thereof.

When thicknesses of the first adhesive layer and the second adhesive layer are too small, it is highly likely the first and second adhesive layers may be destroyed during a manufacturing process. When thicknesses of the first adhesive layer and the second adhesive layer are too great, flexibility may be reduced. In an embodiment, the thicknesses of the first adhesive layer and the second adhesive layer may be in a range of, for example, about 1 µm to about 100 µm.

An embodiment of a method of manufacturing the flexible secondary battery of FIG. 2 will now be described. In such an embodiment, a first electrode layer, a first current collector layer having a surface facing a separator and on which an adhesive agent is printed, the separator, a second current collector layer having a surface facing the separator and on which an adhesive agent is printed, and a second electrode layer are sequentially deposited, and then the structure of first electrode layer-first current collector layer-separator-second current collector layer-second electrode layer is thermally pressed, where during the thermal pressing, the first electrode layer and the separator enter through-holes of the first current collector layer and contact each other, and the second electrode layer and the separator enter through-holes of the second current collector layer and contact each other.

An alternative embodiment of a flexible battery according to the invention may further include a coupling member that binds a current collector and a separator. The coupling member effectively prevents separation of a current collector layer and a separator when a battery is bent. Also, the coupling member effectively prevents any change in relative positions of a current collector layer and a separator resulting from sliding relative to each other when a battery is bent.

Figure 3:
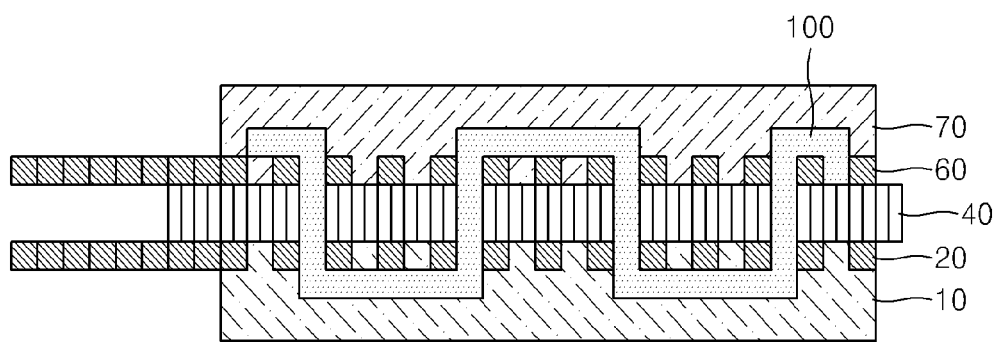
FIG. 3 is a cross-sectional view of another alternative embodiment of a flexible secondary battery according to the invention, where the flexible secondary battery includes an insulating thread for tying together a first current collector layer, a separator and a second current collector layer.

In an embodiment, the coupling member may be, for example, an insulating thread for tying together a first current collector layer, a separator and a second current collector layer. FIG. 3 is a cross-sectional view of an embodiment of the battery according to the invention, which includes an insulating thread 100 for tying together the first current collector layer 20, the separator 40 and the second current collector layer 40. In such an embodiment, the first current collector layer 20, the separator 40 and the second current collector layer 60 are sewn together using the insulating thread 100. The battery of FIG. 3 may be produced by sewing together the first current collector layer 20, the separator 40 and the second current collector layer 60 with the insulating thread 100, and then providing, e.g., forming, the first electrode layer 10 and the second electrode layer 70 on opposite surfaces of the resultant structure. The insulating thread 100 may be formed of, for example, a natural fabric, such as cotton, silk and wool, a synthetic fiber, such as polyester, nylon and rayon, or a combination thereof.

Figure 4:
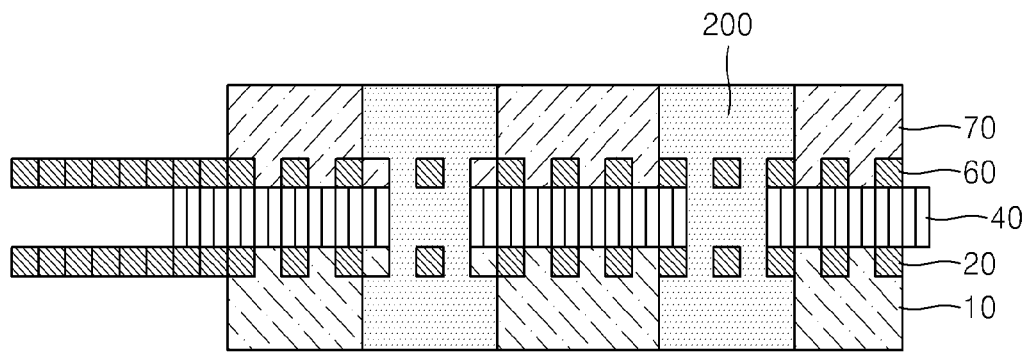
FIG. 4 is a cross-sectional view of another alternative embodiment of a flexible secondary battery according to the invention, where the flexible secondary battery includes a binding pillar.

According to another alternative embodiment, the coupling member may be an insulating pillar (hereinafter, referred to as 'binding pillar') passing through a first electrode layer, a first current collector layer, a separator, a second current collector layer and a second electrode layer. FIG. 4 is a cross-sectional view of another embodiment of the flexible battery according to the invention, which includes a binding pillar 200. The binding pillar 200 passes through the first electrode layer 10, the first current collector layer 20, the separator 40, the second current collector layer 60 and the second electrode layer 70. Upper and lower portions of the binding pillar 200 extend to outer surfaces of the second and first electrode layers 70 and 10. Accordingly, the binding pillar 200 may function as a rivet that binds the first current collector layer 20, the separator 40 and the second current collector layer 60. The battery of FIG. 4 may be produced by coupling the first current collector layer 20, the separator 40, and the second current collector layer 60 with, for example, a plastic rivet, and then by providing, e.g., forming, the first electrode layer 10 and the second electrode layer 70 on opposite surfaces of the resultant structure. In an embodiment, a material of the binding pillar 200 may be as follows: a fluorine resin, such as PVDF, polytetrafluoroethylene, a tetrafluoroethylene-hexafluoropropylene copolymer, or Nafion®; a polyacrylic acid derivative, such as a polyacrylic acid, a polymethyl acrylate ester, a polyethyl acrylate ester, or a polyacrylic acid hexyl ester; a polymethacrylic acid derivative, such as a polymethacrylic acid, a polymethyl methacrylate ester, a polyethyl methacrylate ester, or a polymethacrylic acid hexyl ester; polyvinyl alcohol, polyamide, polyimide, polyamideimide, polyvinylacetate, polyvinylpyrrolidone, polyether, polyethersulfone, hexafluoropolypropylene, a styrene-butadiene rubber, carboxymethyl cellulose, polyacrylonitrile, or a derivative thereof; a polyolefin-based resin, such as polyethylene or polypropylene, an aramid resin, a polymer of an EPDM, or a polyoxyalkylene-based resin, such as a polyoxymethylene-based resin or a polyoxyethylene-based resin; a polyester-based resin, such as a polyethylene terephthalate-based resin or a polybuta thermoplastic elastomer, such as an ester-based thermoplastic elastomer or an olefin-based thermoplastic elastomer xylene terephthalate-based resin; a styrene-based resin, such as an acrylonitrile butadiene styrene ("ABS")-based resin, a polystyrene-based resin, an acrylonitrile styrene acrylate ("ASA")-based resin, or a styrene-butadiene-styrene block copolymer resin; a polyvinylchloride-based resin; a polycarbonate-based resin; a polyphenylene sulfide-based resin; a vinyl alcohol-based resin; a polyamide-based resin; an acrylate-based resin; engineering plastic; polypyrrole; tetrafluoroethylene, hexafluoroethylene, hexafluoropropylene, a perfluoroalkyl vinyl ether, or vinylidene fluoride; chlorotrifluoroethylene, ethylene, propylene, pentafluoropropylene, a fluoromethyl vinyl ether, an acrylic acid, or hexadiene; or a copolymer or mixture thereof.

Figure 5:
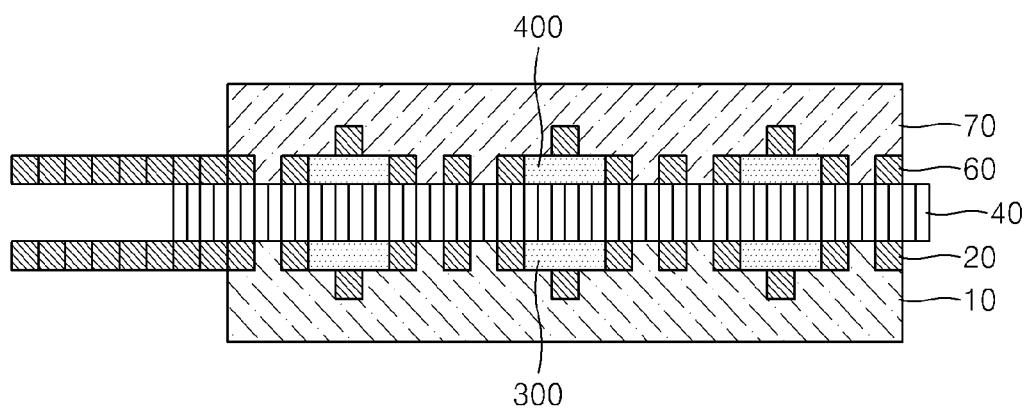
FIG. 5 is a cross-sectional view of another alternative embodiment of a flexible secondary battery according to the invention, where the flexible secondary battery includes a third adhesive layer and a fourth adhesive layer.

According to another alternative embodiment, the coupling member may be a third adhesive layer that fills some of through-holes of a first current collector layer. According to another alternative embodiment, the coupling member may be a fourth adhesive layer that fills some of through-holes of a second current collector layer. The third adhesive layer and the fourth adhesive layer may be used together. FIG. 5 is a cross-sectional view of another alternative embodiment of a flexible battery according to the invention, including a third adhesive layer 300 and a fourth adhesive layer 400. The third adhesive layer 300 filling some of the through-holes of the first current collector layer 20 may bind the first electrode layer 10 and the separator 40, and due to a rivet structure defined by binding the first electrode layer 10, the third adhesive layer 300 and the separator 40, the first current collector layer 20 may be attached to the separator 40. Likewise, the fourth adhesive layer 400 filling some of the through-holes of the second current collector layer 60 may bind the second electrode layer 70 and the separator 40. Also, due to a rivet structure defined by binding the second electrode layer 70, the fourth adhesive layer 400 and the separator 40, the second current collector layer 60 may be attached to the separator 40. In an embodiment, the third adhesive layer and the fourth adhesive layer may include one of materials as follows: a polyvinylalcohol-based resin; cellulose, nylon, polyacetal, a vinyl chloride resin, a polystyrene, or an ABS resin; a fluorine resin, such as PVDF, polytetrafluoroethylene, a tetrafluoroethylene-hexafluoropropylene copolymer, or Nafion®; a polyacrylic acid derivative, such as a polyacrylic acid, a polymethyl acrylate ester, a polyethyl acrylate ester, a polyacrylic acid hexyl ester, or a polyacrylic acid hexyl ester; a polymethacrylic acid derivative, such as a polymethacrylic acid, a polymethyl methacrylate ester, a polyethyl methacrylate ester, or a polymethacrylic acid hexyloxyl ester; polyamide, polyimide, polyamideimide, polyvinylacetate, polyvinylpyrrolidone, polyether, polyethersulfone, hexafluoropolypropylene, a styrene-butadiene rubber, carboxymethyl cellulose, polyacrylonitrile, or a derivative thereof; polyethylene, polypropylene, a aramid resin, a polymer of an EPDM, PEO, or polypyrrol; a copolymer of two or more materials selected from tetrafluoroethylene, hexafluoroethylene, hexafluoropropylene, a perfluoroalkyl vinyl ether, vinylidene fluoride, chlorotrifluoroethylene, ethylene, propylene, pentafluoropropylene, a fluoromethyl vinyl ether, an acrylic acid, and hexadiene; or a combination thereof.

Figure 6:
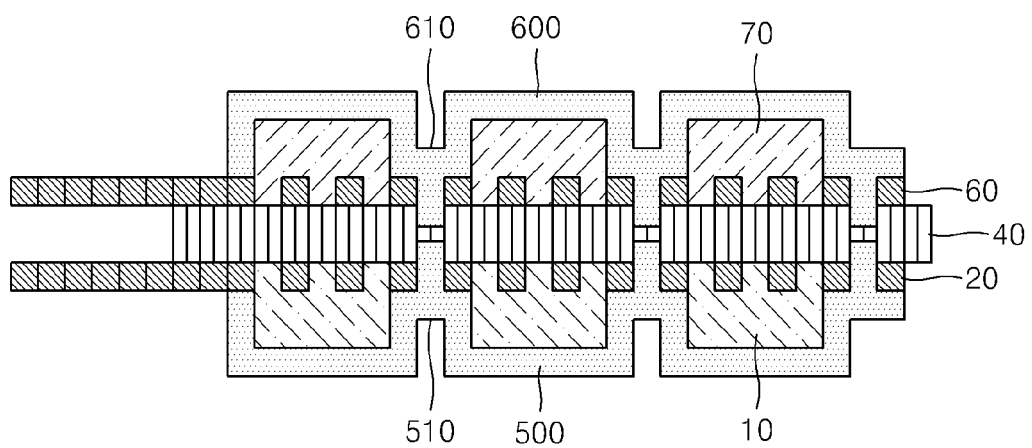
FIG. 6 is a cross-sectional view of another alternative embodiment of a flexible secondary battery according to the invention, where the flexible secondary battery includes a first polymer film and a second polymer film each having a plurality of pressing points.

According to another alternative embodiment, the coupling member may include a first polymer film coated on an outer surface of a first electrode layer, and a second polymer film coated on an outer surface of a second electrode layer. The first polymer film has a plurality of pressing points passing through the first electrode layer and binding to a separator, and the second polymer film has a plurality of pressing points passing through the second electrode layer and binding to the separator. FIG. 6 is a cross-sectional view of another alternative embodiment of a flexible battery according to the invention, further including a first polymer film 500 and a second polymer film 600. In such an embodiment, the first and second polymer films 500 and 600 bind to the separator 40 due to pressing points 510 and 610, as illustrated in FIG. 6, such that the first electrode layer 10, the first current collector layer 20, the second current collector layer 60 and the second electrode layer 70 may be attached to the separator 40 in a thickness direction and a planar direction of a battery.

According to another alternative embodiment of a flexible battery according to the invention, a 180° peeling strength of a first current collector layer and a separator or a 180° peeling strength of a second current collector layer and the separator may be in a range of about 1 newton per meter (N/m) to about 1000 newtons per meter (N/m). If the 180° peeling strength of the first current collector layer and the separator or the 180° peeling strength of the second current collector layer and the separator is less than about 1 N/m, when the flexible battery is bent, the separator may be separated from the current collector layers, and when the 180° peeling strength of the first current collector layer and the separator or the 180° peeling strength of the second current collector layer and the separator is higher than about 1000 N/m, an amount of a material used for binding may be increased and thus performance of a formed battery may be lowered.

In an embodiment, a half cell of a battery may include a first electrode layer, a first current collector layer that is disposed on the first electrode layer and has a plurality of through-holes; and a separator disposed on the first current collector layer. The half cell may further include a first adhesive layer disposed on at least a portion of a surface of the first current collector layer that faces the separator. The first electrode layer may be a positive electrode or a negative electrode. The half cell may form a battery by, for example, stacking a third electrode layer including a third current collector layer on an outer surface thereof. The third electrode layer may have a polarity that is different from a polarity of the first electrode layer. The third current collector layer may be, for example, a metal thin film, carbon paper, a conductive mesh screen or a conductive perforated film. In an embodiment of a battery including the half cell, when the first electrode layer is bent toward a center of the radius of curvature, the first current collector layer is not exfoliated from the separator.

Figure 7:
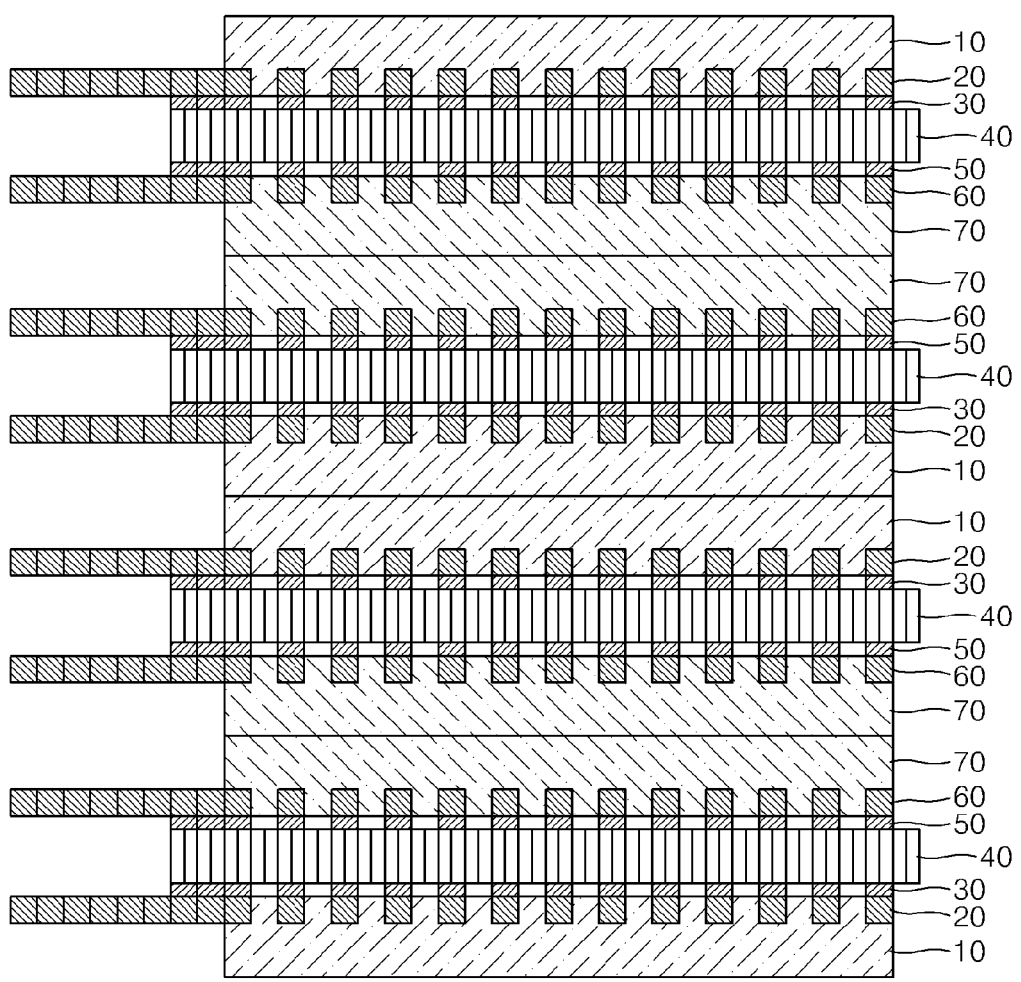
FIG. 7 is a cross-sectional view of an embodiment of a battery stack including a plurality of secondary batteries arranged such that electrode layers having the same polarity are adjacent to each other.

In an embodiment of a battery stack formed by stacking a plurality of flexible secondary batteries according to the invention, the flexible secondary batteries are arranged such that electrode layers having the same polarity are adjacent to each other. FIG. 7 is a cross-sectional view of an embodiment of a battery stack including a plurality of flexible secondary batteries arranged such that electrode layers having the same polarity are adjacent to each other. Referring to FIG. 7, the first electrode layers 10 are negative electrodes, and the second electrode layers 70 are negative electrodes. Accordingly, adjacent first electrode layers 10 have the same polarity. In such an embodiment, adjacent second electrode layers 70 have the same polarity.

Figure 8:
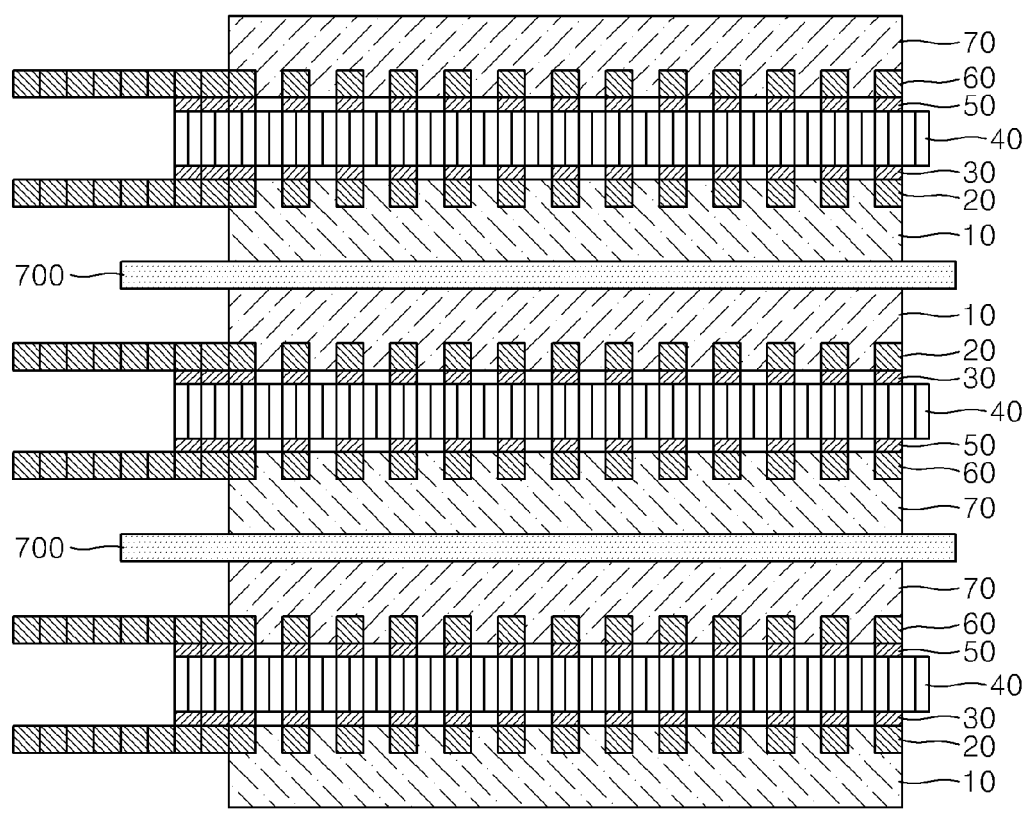
FIG. 8 is a cross-sectional view of an alternative embodiment of a battery stack including a conductive or non-conductive thin film inserted between adjacent electrode layers having a same polarity.

In an embodiment, the battery stack may further include a conductive or non-conductive thin film interposed between adjacent electrode layers. The thin film may reduce friction between adjacent electrode layers when a battery is deformed, thereby allowing adjacent electrode layers to easily slip with respect to each other. In such an embodiment, the thin film prevents damage of electrode layers due to the friction therebetween. FIG. 8 is a cross-sectional view of another embodiment of a battery stack including a conductive or non-conductive thin film 700 inserted between adjacent electrode layers having the same polarity. Referring to FIG. 8, the first electrode layers 10 are negative electrodes, and the second electrode layers 70 are positive electrodes. Accordingly, adjacent first electrode layers 10 have the same polarity, and adjacent second electrode layers 70 have the same polarity. In such an embodiment, the conductive or non-conductive thin film 700 is inserted between adjacent first electrode layers 10 and adjacent second electrode layers 70.

Figure 9:
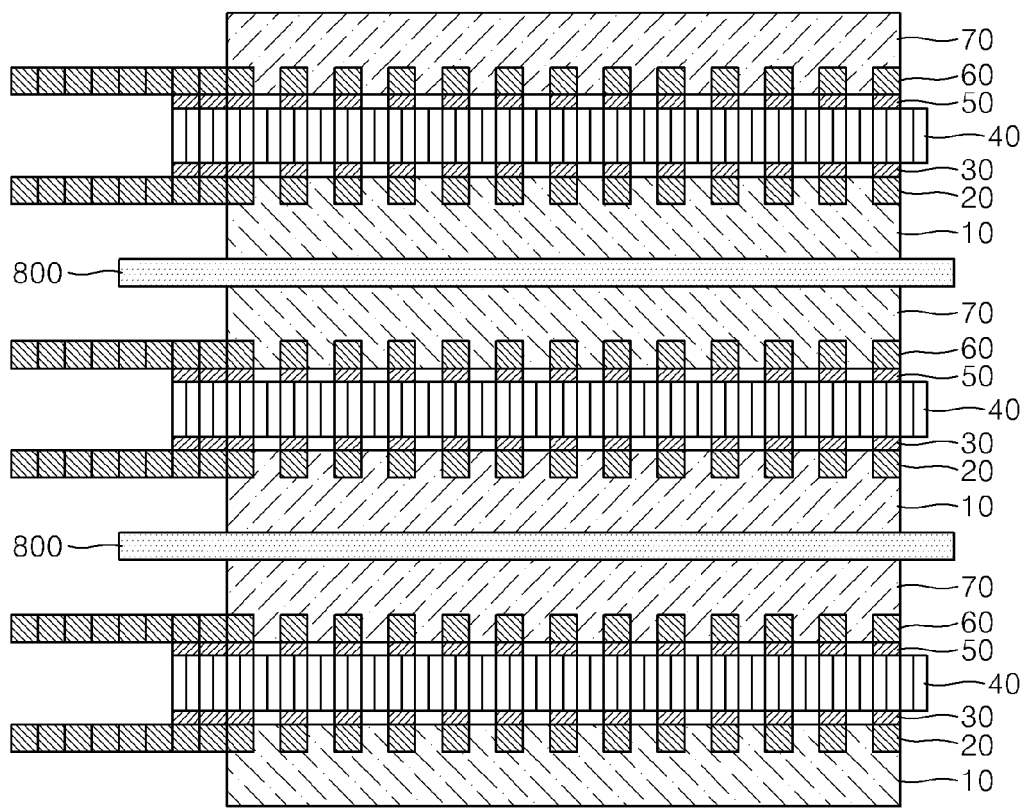
FIG. 9 is a cross-sectional view of another alternative embodiment of a battery stack including a plurality of secondary batteries arranged such that electrode layers having different polarities are adjacent to each other.

In an alternative embodiment of a battery stack formed by stacking a plurality of flexible secondary batteries according to the invention, the flexible secondary batteries are arranged such that electrode layers having different polarities are adjacent to each other, and an insulating film is inserted between adjacent electrode layers. FIG. 9 is a cross-sectional view of an embodiment of a battery stack including a plurality of secondary batteries arranged such that electrode layers having different polarities are adjacent to each other. Referring to FIG. 9, the first electrode layers 10 are negative electrodes, and the second electrode layers 70 are positive electrodes. Accordingly, adjacent first and second electrode layers 10 and 70 have different polarities, and an insulating film 800 is inserted between adjacent first and second electrode layers 10 and 70. The insulating film 800 effectively prevents shorting between electrodes having different polarities in the battery stack. In such an embodiment, the insulating film may reduce friction between electrode layers, and thus, when a battery is deformed, electrode layers may effectively slip with respect to each other, and damage of electrode layers due to the friction may be reduced.

Hereinafter, experimental examples of manufacturing embodiments of the battery will be described in greater detail, but the invention is not limited thereto or thereby.

EXAMPLE 1

A positive electrode layer (first electrode layer) slurry was coated on a surface of a first current collector (thickness of about 57 μm, 400-mesh woven stainless steel; USA, Gilson company, WC-400s #400). The positive electrode layer slurry was obtained using about 95 parts by weight of a lithium-nickel-cobalt-manganese composite oxide (South Korea, DAJEON EM, N60B), about 2.5 parts by weight of a conductive agent (Swiss, TIMCAL, "Super P"), about 2.5 parts by weight of polyvinylidene fluoride ("PVDF") (Japan, Kureha, KF9200), and about 70 parts by weight of 1-methyl-2-pyrrolidone ("NMP") (USA, SIGMA-ALDRICH, anhydrous, 99.5%).

A negative layer (second electrode layer) slurry was coated on a surface of a second current collector (thickness of about 57 μm, 4; USA, Gilson company, WC-400s #400). The negative layer slurry was obtained using about 95 parts by weight of graphite (Swiss, TIMCAL, "SFG6"), about 2.5 parts by weight of a styrene-butadiene rubber ("SBR") (Japan, Zeon, BM-400B), about 2.5 parts by weight of carboxy methyl celluose ("CMC") (Japan, Daicel FineChem, CMC Daicel 1380), and about 215 parts by weight of deionized water.

The first current collector and the second current collector were dried at a temperature of about 80° C. in a convection oven for about 2 hours, and then rolled with a pressure of about 1000 kilogram-forces per square centimeter (kgf/cm$^2$). The dried and rolled first current collector was cut to a size of about 11 mm×about 41 mm. The dried and rolled second current collector was cut to a size of about 12 mm×about 42 mm.

The first current collector and the second current collector were attached to two surfaces of a polyolefin separator having a thickness of about 25 μm (USA, "Celgard" Company, 2325). As an adhesive, an aqueous solution in which about 8 weight percent (wt %) polyvinylalcohol (USA, SIGMA-ALDRICH, Poly(vinyl alcohol), Mw 85,000-124,000) was dissolved was used. By doing so, a laminate having a stack structure of positive electrode layer (first electrode layer)-first current collector-adhesive layer-separator-adhesive layer-second current collector-negative electrode layer (second electrode layer) was formed.

The stack structure was packaged with an aluminum pouch film having a thickness of about 88 μm produced by Dai Nippon Printing ("DNP") Company (Japan) and then an electrolyte (1.3M LiPF$_6$ in a mixed solvent of ethylene carbonate ("EC"), and diethylene carbonate ("DEC") at a volumetric ratio of 3:7) was injected therein, thereby completing manufacturing of a battery of Example 1.

EXAMPLE 2

A battery was manufactured in the same manner as in Example 1, except that when the current collectors were attached to the separator, a double-sided tape 9492MP manufactured by 3M Corporate was used instead of the polyvinylalcohol solution. The double-sided tape was cut to a width of 1 mm, and then the cut pieces of tape were aligned at intervals of about 5.67 mm.

COMPARATIVE EXAMPLE 1

A battery was manufactured in the same manner as in Example 1, except that an aluminum foil having a thickness of about 15 μm was used as the first current collector, a copper foil having a thickness of about 15 μm was used as the second current collector, and a stack structure of first current collector-positive electrode layer (first electrode layer)-adhesive layer-separator-adhesive layer-negative layer (second electrode layer)-second current collector was used.

COMPARATIVE EXAMPLE 2

A battery was manufactured in the same manner as in Comparative Example 1, except that the laminate was not attached using the polyvinylalcohol solution, and a stack structure of first current collector-negative electrode layer first electrode layer-separator-negative layer second electrode layer-second current collector was used.

<Evaluation Method>

[Charging Capacity Retention Performance Evaluation]

First, an initial charging capacity of each of the batteries was measured at a current of about 0.5 coulomb (C). Then, the batteries were bent to have a radius of curvature of about 10 centimeters (cm) and then unbent about 1000 times. Then, a post-bending initial charging capacity of each of the batteries was measured. A percentage point of the post-bending charging capacity with respect to the initial charging capacity was calculated.

The batteries, which had been subjected to the charging capacity retention performance evaluation, were dissembled to evaluate a peeling strength between a separator and an electrode layer (Comparative Example 2) or a peeling strength between a separator and current collector layers (Examples 1 and 2, and Comparative Example 1).

[Peeling Strength Evaluation]

A 180° peeling strength test was performed with respect to a binding between a separator and an electrode using UTM 3342 model of INSTRON Company. A separation position between a first current collector layer and a second current collector layer was identified, and a peeling strength of the separation position was measured. Exfoliation occurs where an attachment power between respective layers is weakest among boundaries therebetween. The peeling strength was measured by performing the test on a about 4 cm-region of a battery sample at a speed of about 1 millimeter per second (mm/s), and then calculating an average value with respect to a stable about 2 cm-region thereof.

[Bending Test to the Radius of Curvature of 25 mm]

A stack structure before being packaged with a pouch film was bent up to a radius of curvature of about 25 mm, and the state of the stack structure was observed.

Evaluation results are shown in Table 1.

TABLE 1

|  | Bending test to a radius of curvature of 25 mm | Charging capacity retention performance | peeling strength, and (exfoliation position) |
|---|---|---|---|
| Example 1 | No exfoliation, and rupturing | 99% | 13.9 N/m (between the second current collector layer and the separator) |
| Example 2 | No exfoliation, and rupturing | 96% | 33.8 N/m (between the first current collector layer and the separator) |
| Comparative Example 1 | Rupturing of first current collector layer | 32% | 4.5 N/m (between the second electrode layer and the second current collector layer) |
| Comparative Example 2 | Exfoliation of the first electrode layer from the separator | Occurrence of shorting between both electrodes | 0.33 N/m (between the first electrode layer and the separator) |

According to the embodiments of flexible secondary batteries described herein, an attachment power between a first current collector layer and a separator is relatively strong such that when the batteries are bent by pulling opposite ends thereof down, the first current collector layer is not exfoliated from the separator. In such embodiments, a second current collector layer, the separator and the first current collector layer may support each other. As described above, due to locations of the first and second current collect layers, the flexibility of the batteries is substantially improved.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A flexible secondary battery comprising:
   a first electrode layer;
   a first current collector layer disposed on the first electrode layer, wherein a plurality of through-holes is defined in the first current collector layer;
   a separator disposed on the first current collector layer;
   a second current collector layer disposed on the separator, wherein a plurality of through-holes is defined in the second current collector layer; and
   a second electrode layer disposed on the second current collector layer,
   wherein the second current collector is interposed between the separator and the second electrode layer,
   where the separator contacts the second electrode layer through the through-holes of the second current collector layer; and
   wherein the flexible secondary battery further comprises a coupling member which binds current collector layers and separator.

2. The flexible secondary battery of claim 1, wherein a 180° peeling strength of the first current collector layer and the separator or of the second current collector layer and the separator is in a range of about 1 N/m to about 1000 N/m.

3. The flexible secondary battery of claim 1, wherein each of the first current collector layer and the second current collector layer is a conductive mesh screen or a conductive perforated film.

4. The flexible secondary battery of claim 1, wherein each of the first current collector layer and the second current collector layer comprises copper, stainless steel, titanium, nickel, aluminum, or a combination or alloy thereof.

5. The flexible secondary battery of claim 1, wherein a thickness of each of the first current collector layer and the second current collector layer is in a range of about 1 μm to about 100 μm.

6. The flexible secondary battery of claim 1, wherein a diameter of the through-holes of each of the first current collector layer and the second current collector layer is in a range of about 50 μm to about 2 mm.

7. The flexible secondary battery of claim 1, wherein a number of the through-holes of each of the first current collector layer and the second current collector layer is in a range of about 10 per inch to about 400 per inch.

8. The flexible secondary battery of claim 1, wherein a total thickness of the flexible secondary battery is in a range of about 25 μm to about 2 mm.

9. The flexible secondary battery of claim 1, further comprising a substrate attached to an outer surface of the first electrode layer.

10. The flexible secondary battery of claim 1, further comprising a first adhesive layer disposed on at least a portion of a surface of the first current collector layer, which faces the separator.

11. The flexible secondary battery of claim 10, wherein the first adhesive layer comprises: a polyvinylalcohol-based resin; a fluorine resin, such as polyvinylidene fluoride (PVDF), polytetrafluoro ethylene, a tetrafluoroethylene-hexafluoropropylene copolymer or Nafion®; a polyacrylic acid-based resin, such as a polyacrylic acid, a polymethyl acrylate ester, a polyethyl acrylate ester or a polyacrylic acid hexyl ester; a polymethacrylic acid-based resin, such as a polymethacrylic acid, a polymethyl methacrylate ester, a polyethyl methacrylate ester or a polymethacrylic acid hexyl ester; polyamide, polyimide, polyamideimide, polyvinylacetate, polyvinylpyrrolidone, polyether, polyethersulfone, hexafluoropolypropylene, styrene-butadiene rubber, carboxymethyl cellulose, polyacrylonitrile or a derivative thereof; polyethylene, polypropylene, an aramid resin, a polymer of an ethylene propylene diamine monomer (EPDM), polyethylene oxide (PEO) or polypyrrol; a copolymer of two or more materials selected from tetrafluoro ethylene, hexafluoro ethylene, hexafluoropropylene, a perfluoroalkyl vinyl ether, vinylidene fluoride, chlorotrifluoroethylene, ethylene, propylene, pentafluoropropylene, a fluoromethyl vinyl ether, an acrylic acid and hexadiene; or a combination thereof.

12. The flexible secondary battery of claim 10, wherein a thickness of the first adhesive layer is in a range of about 0.01 µm to about 100 µm.

13. The flexible secondary battery of claim 1, further comprising a second adhesive layer disposed on at least a portion of a surface of the second current collector layer, which faces the separator.

14. The flexible secondary battery of claim 13, wherein the second adhesive layer comprises: a polyvinylalcohol-based resin; a fluorine resin, such as polyvinylidene fluoride (PVDF), polytetrafluoro ethylene, a tetrafluoroethylene-hexafluoropropylene copolymer or Nafion®; a polyacrylic acid-based resin, such as a polyacrylic acid, a polymethyl acrylate ester, a polyethyl acrylate ester or a polyacrylic acid hexyl ester; a polymethacrylic acid-based resin, such as a polymethacrylic acid, a polymethyl methacrylate ester, a polyethyl methacrylate ester or a polymethacrylic acid hexyl ester; polyamide, polyimide, polyamideimide, polyvinylacetate, polyvinylpyrrolidone, polyether, polyethersulfone, hexafluoropolypropylene, styrene-butadiene rubber, carboxymethyl cellulose, polyacrylonitrile or a derivative thereof; polyethylene, polypropylene, an aramid resin, a polymer of an ethylene propylene diamine monomer (EPDM), polyethylene oxide (PEO) or polypyrrol; a copolymer of two or more materials selected from tetrafluoro ethylene, hexafluoro ethylene, hexafluoropropylene, a perfluoroalkyl vinyl ether, vinylidene fluoride, chlorotrifluoroethylene, ethylene, propylene, pentafluoropropylene, a fluoromethyl vinyl ether, an acrylic acid and hexadiene; or a combination thereof.

15. The flexible secondary battery of claim 13, wherein a thickness of the second adhesive layer is in a range of about 0.01 µm to about 100 µm.

16. The flexible secondary battery of claim 1, wherein the coupling member comprises an insulating thread which ties together the first current collector layer, the separator and the second current collector layer.

17. The flexible secondary battery of claim 1, wherein the coupling member comprises an insulating pillar which passes through the first electrode layer, the first current collector layer, the separator, the second current collector layer and the second electrode layer.

18. The flexible secondary battery of claim 1, wherein the coupling member comprises a third adhesive layer which fills some of the through-holes of the first current collector layer.

19. The flexible secondary battery of claim 1, wherein the coupling member comprises a fourth adhesive layer which fills some of the through-holes of the second current collector layer.

20. The flexible secondary battery of claim 1, wherein
the coupling member comprises:
a first polymer film coated on an outer surface of the first electrode layer; and
a second polymer film coated on an outer surface of the second electrode layer,
wherein
the first polymer film has a plurality of pressing points which passes through the first electrode layer and the first current collector layer and binds to the separator, and
the second polymer film has a plurality of pressing points which passes through the second electrode layer and the second current collector layer and binds to the separator.

* * * * *